US005732593A

United States Patent [19]
Hwang et al.

[11] Patent Number: 5,732,593
[45] Date of Patent: Mar. 31, 1998

[54] BICYCLE SPEED CHANGING APPARATUS

[75] Inventors: Yuh-Ming Hwang, Kaohsiung; Chung-Ping Chiang; Chang-Dau Yan, both of Taipei, all of Taiwan

[73] Assignee: Industrial Technology Research Institute, Hsinchu Hsien, Taiwan

[21] Appl. No.: 594,550

[22] Filed: Jan. 31, 1996

[51] Int. Cl.$^6$ .......................... B62M 25/04; B62K 23/06
[52] U.S. Cl. .......................... 74/142; 74/475; 74/489; 74/502.2
[58] Field of Search .......................... 74/475, 489, 502.2, 74/142

[56] References Cited

U.S. PATENT DOCUMENTS

| | | | |
|---|---|---|---|
| 5,012,692 | 5/1991 | Nagano | 74/489 X |
| 5,095,768 | 3/1992 | Nagano | 74/489 X |
| 5,203,213 | 4/1993 | Nagano | 74/489 X |
| 5,213,005 | 5/1993 | Nagano | 74/489 X |
| 5,241,878 | 9/1993 | Nagano | 74/489 X |
| 5,307,706 | 5/1994 | Nagano | 74/489 X |
| 5,400,675 | 3/1995 | Nagano | 74/489 X |

*Primary Examiner*—Allan D. Herrmann

[57] ABSTRACT

A bicycle speed changing apparatus comprises a support means, a cable winding means, a fixation plate, a high gear shifting means, a retaining mechanism, a low gear shifting means, and a transmission mechanism. The support means is fastened with the handlebar of a bicycle. The low gear shifting means has a low turning rod connected with the support means by a first retrieving spring and provided with a first braking portion. The cable winding means is connected with the support means by a torsion spring. The fixation plate is provided with a second braking portion. The high gear shifting means has a high turning rod fastened with the fixation plate by a second retrieving spring. The retaining mechanism has a shaft fastened pivotally with the support means and the fixation plate. The shaft is provided with an engaging means and a first cam, a first ratchet portion and a third braking portion. The shaft is connected with the support means by a first pressing spring so as to cause the first cam, the first ratchet portion and the third braking portion to become engaged with the first braking portion, the first engaging portion, and the third cam of the high gear shifting means at the time when the first cam, the first ratchet portion and the third braking portion are set at a neutral position. The transmission mechanism has a shaft fastened pivotally with the high turning rod and provided with a braking member, a second cam and a second ratchet portion. When at a neutral position, the second cam is engaged with the second braking portion. When the high turning rod is actuated, the second ratchet portion is engaged with the second engaging portion.

21 Claims, 5 Drawing Sheets

BICYCLE SPEED CHANGING APPARATUS

FIELD OF THE INVENTION

The present invention relates generally to a component of a bicycle, and more particularly to a speed changing apparatus of the bicycle.

BACKGROUND OF THE INVENTION

The U.S. Pat. No. 5,044,213 "Speed Control Apparatus for a Bicycle" discloses a bicycle speed control apparatus, which is provided with a high gearshifting rod, a low gearshifting rod, and a cable winding disk having three ratchet portions connected respectively with a high gear pawl, a locating pawl and a buffer pawl. The low gearshifting rod is provided with three cams engaging the high gear pawl, the locating pawl and the buffer pawl. When the high gearshifting rod is turned, the cable winding disk is actuated by the high gear pawl to pull the cable to complete the high gearshifting motion. When the low gearshifting rod is turned, the high gear pawl is caused to disengage the ratchet portion before the buffer pawl is retained by the ratchet portion. The locating pawl is finally pushed away to disengage the ratchet portion. The low gearshifting rod is released to allow the high gear pawl, the buffer pawl and the locating pawl to retrieve so as to complete the low gearshifting motion.

Such a prior art bicycle speed control apparatus as described above is defective in design in that the coordinated actions of three cams and three pawls can not be always brought about with precision in view of the mechanical fatigue of the component parts. In addition, since each pawl cam system is operated independently, there need three pawl cam system to complete one high or low gearshifting motion. Thus, the prior art bicycle speed control apparatus is equipped with too many single function components and is rather complicated in construction and is not cost-effective. Moreover, the prior art bicycle speed control apparatus isn't compact because each component can not be utilized completely.

SUMMARY OF THE INVENTION

It is therefore the primary objective of the present invention to provide a bicycle speed changing apparatus with compulsory actuating functions among components and capable of operating with precision.

It is another objective of the present invention to provide a bicycle speed changing apparatus with fewer components, which is relatively compact and simple in construction and is cost effective.

In order to achieve the above objectives, a bicycle speed changing apparatus according to the present invention comprises a support means fastened on a handlebar of a bicycle, a cable winding means fastened pivotally on said support means for winding a cable to bring about a high gear action or a low gear action, a retaining mechanism for retaining said cable winding means to remain at a fixed position for enabling the speed changing apparatus to remain at a fixed gear, a low gear shifting means fastened pivotally on said support means for turning said retaining mechanism to become disengaged with said cable winding means and causing said cable winding means to turn freely to release the cable, a transmission mechanism for driving said cable winding means to turn to tighten up the cable in the process of a high gear action, or preventing temporarily said cable winding means from turning in the process of a low gear action, and a high gear shifting means fastened pivotally on said support means for actuating said transmission mechanism to produce the action as described above.

The foregoing objectives, features and functions of the present invention will be more readily understood upon a thoughtful deliberation of the following detailed description of the present invention in conjunction with the accompanying drawings.

DETAILED DESCRIPTION OF THE INVENTION

Figure 1:
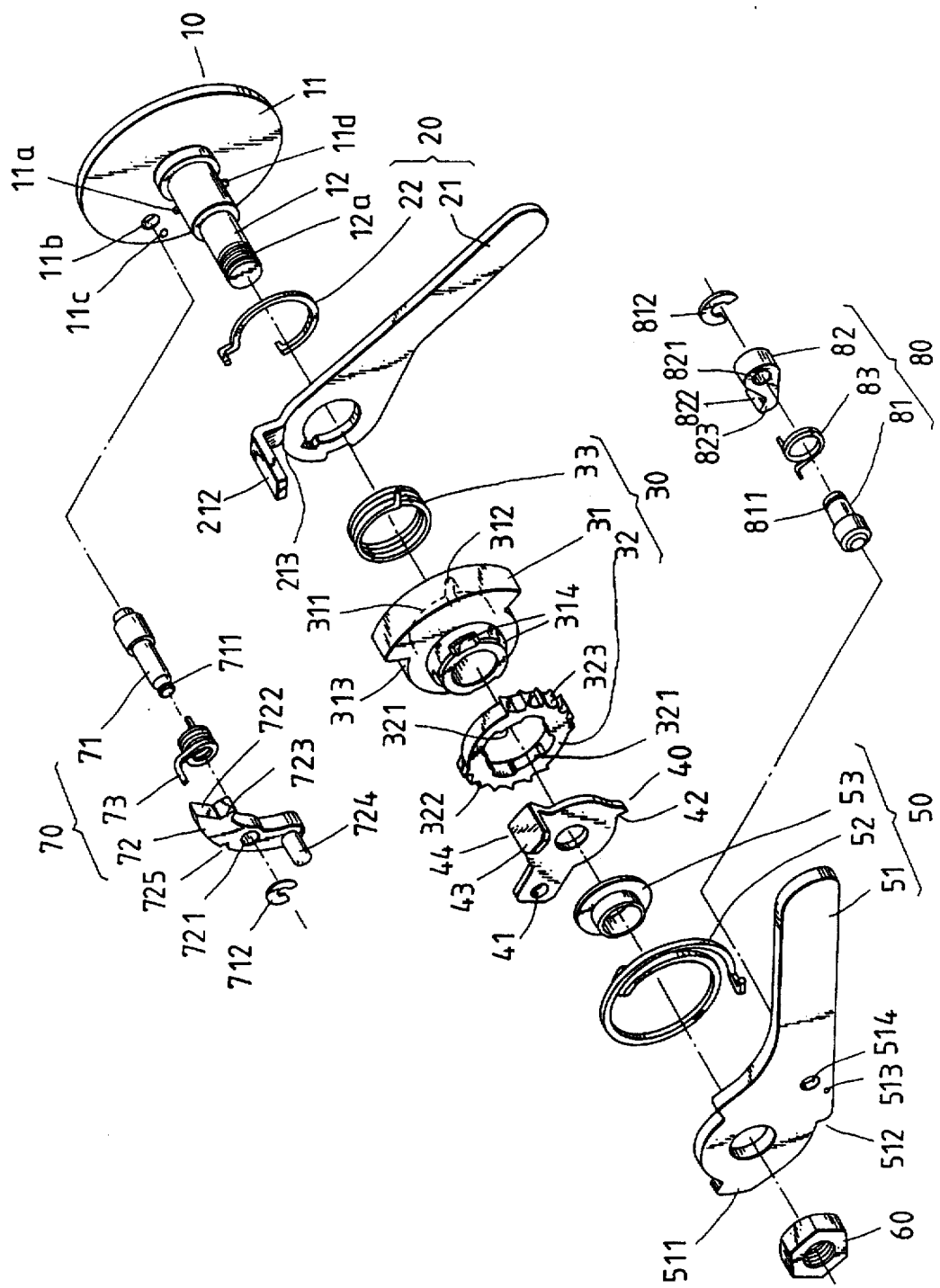
FIG. 1 shows an exploded view of the present invention.
Figure 2:
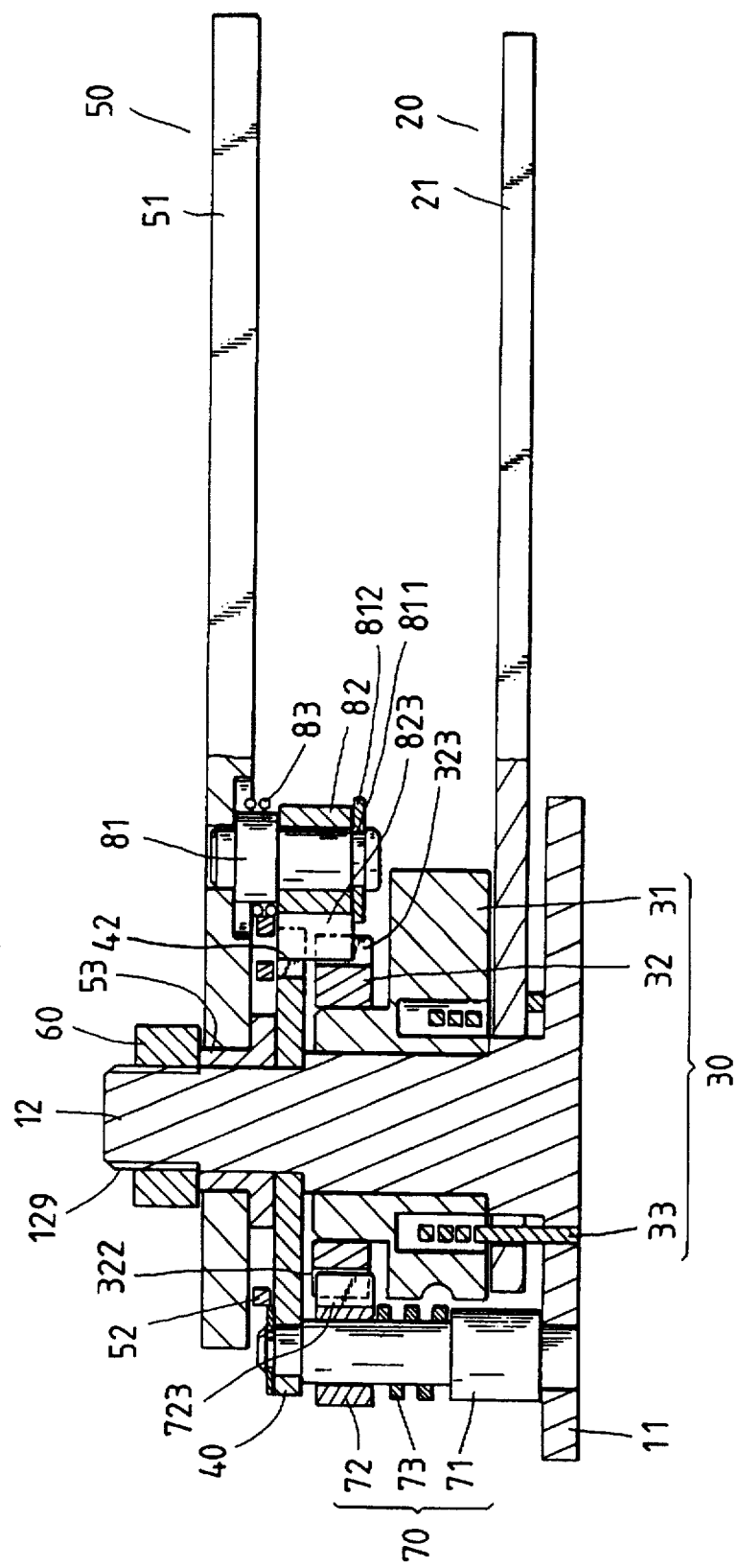
FIG. 2 shows a longitudinal sectional view of the present invention in combination.

As shown in FIGS. 1 and 2, a bicycle speed changing apparatus of the present invention comprises the component parts which are described explicitly hereinafter.

A support means 10 is fastened on the handlebar of a bicycle and is of a stepped tubular construction. The support means has a disk 11 and a spindle 12. The disk 11 is provided with four through holes 11a, 11b, 11c and 11d while the spindle 12 is provided at the top end thereof with a male thread 12a.

A low gear shifting means 20 is fastened pivotally with the support means 10 and is provided with a low turning rod 21 and a first retrieving spring 22. The low turning rod 21 is fastened pivotally with the spindle 12 of the support means 10 and is capable of rotating back and forth with the spindle 12 and is provided with a first braking portion 212 perpendicular to the low turning rod 21, and a curved shoulder 213. The first retrieving spring 22 is received at one end thereof in the through hole 11d of the support means 10 and is retained at another end thereof in the shoulder 213 of the low turning rod 21. The first retrieving spring 22 enables the low turning rod 21 to return to its initial position after being moved.

A cable winding means 30 is fastened pivotally with the spindle 12 of the support means 10 and on the low gear shifting means 20. The cable winding means 30 has a cable winding disk 31, an engaging gear disk 32 and a torsion spring 33. The cable winding disk 31 is provided at the bottom thereof with a circular slot 311 in communication with a radial slot 312, and at the center thereof with an arcuate slot 313 for winding the steel cable. The cable winding means 30 thus can be turned back and forth for pulling or releasing the steel cable. The cable winding disk 31 is provided at the top thereof with a plurality of splines 314. The engaging gear disk 32 is provided at the center thereof with a plurality of splines 321 engageable with the splines 314 of the cable winding disk 31 so as to enable the engaging gear disk 32 to move synchronously with the cable winding disk 31. The engaging gear disk 32 is provided peripherally with a first engaging portion 322 and a second engaging portion 323, which have respectively certain teeth corresponding in location to certain gears of the speed changing device. The torsion spring 33 is received in the circular slot 311 of the cable winding disk 31 such that one end of the torsion spring 33 is retained in the radial slot 312, and that another end of the torsion spring 33 is retained in the through hole 11a of the support member 10.

A fixation plate 40 is fastened with the spindle 12 of the support means 10 and the cable winding means 30. The fixation plate 40 is provided at one end thereof with a round hole 41 and at another end thereof with a second braking portion 42. The fixation plate 40 is further provided vertically in one side thereof with a plate piece 43 and a curved portion forming a shoulder 44.

A high gear shifting means 50 is fastened with the spindle 12 of the support means 10 and the fixation plate 40. The high gear shifting means 50 has a high turning rod 51, a second retrieving spring 52, and a separation ring 53. The high turning rod 51 is fastened pivotally with the spindle 12 of the support means 10 and is capable of rotating back and forth in relation to the spindle 12. The high turning rod 51 is provided at one end thereof with a third cam 511 and at another end thereof with a shoulder 512 and two insertion holes 513 and 514. The second retrieving spring 52 is retained at one end thereof by the shoulder 44 of the fixation plate 40 and at another end thereof by the shoulder 512 of the high turning rod 51. The high turning rod 51 is enabled to return to its initial position by the second retrieving spring 52 after the high turning rod 51 is moved. The separation ring 53 is to keep the high turning rod 51 and the fixation plate 40 apart by a constant distance for disposing the second retrieving spring 52.

A nut 60 is engaged with the male thread 12a of the spindle 12 of the support means 10 for securing the low turning rod 20, the cable winding means 30, the fixation plate 40 and the high turning rod 50 in place on the support means 10.

A retaining mechanism 70 is located between the fixation plate 40 and the disk portion 11 of the support means 10. The retaining mechanism 70 comprises a shaft 71, an engaging member 72 and a first pressing spring 73. The shaft 71 is received at one end thereof in the through hole 11b of the disk portion 11 of the support means 10 such that another end of the shaft 71 is received in and located beyond the round hole 41 of the fixation plate 40. The shaft 71 is provided peripherally at another end thereof with a circular groove 711 in which a C-shaped retaining ring 712 is received. The engaging member 72 is provided at the center thereof with an axial hole 721 and is fastened pivotally with the shaft 71. The engaging member 72 is provided on one side thereof with a first cam 722, a first ratchet portion 723 and a third braking portion 724 and is further provided at another side thereof with a fixation slot 725. The first pressing spring 73 is fitted over the shaft 71 such that one end of the spring 73 is retained in the through hole 11c of the support means 10 and that another end of the spring 73 is retained in the fixation slot 725 of the engaging member 72. When set at a neutral position, the spring 73 enables the first cam 722, the first ratchet portion 723 and the third braking portion 724 of the engaging member 72 to urge respectively the first braking portion 212 of the low turning rod 21, the first engaging portion 322 of the engaging gear disk 32 and the third cam 511 of the high turning rod 51 at the time when the first cam 722, the first ratchet portion 723 and the third braking portion 724 of the engaging member 72 are set at a neutral position.

A transmission mechanism 80 is fastened pivotally with the high turning rod 51. The transmission mechanism 80 comprises a shaft 81, a braking member 82 and a second pressing spring 83. The shaft 81 is received at one end thereof in the insertion hole 514 of the high turning rod 51 and is provided at another end thereof with a circular groove 811 for receiving therein a C-shaped retaining ring 812 for preventing the braking member 82 and the second pressing spring 83 from becoming disengaged. The braking member 82 is provided with an axial hole 821 and is fastened pivotally with the shaft 81. The braking member 82 is further provided on one side thereof with a second cam 822 and a second ratchet portion 823. The second pressing spring 83 is retained at one end thereof in the insertion hole 513 of the high turning rod 51 and is disposed at another end thereof on the plate of the braking member 82. The spring 83 enables the second cam 822 to urge the second braking portion 42 when the second cam 822 is set at a neutral position. In the meantime, the second ratchet portion 823 is disengaged with the second engaging portion 323 of the engaging gear disk 32.

The speed changing apparatus of the present invention is operated according to the processes described hereinafter.

Figure 3:
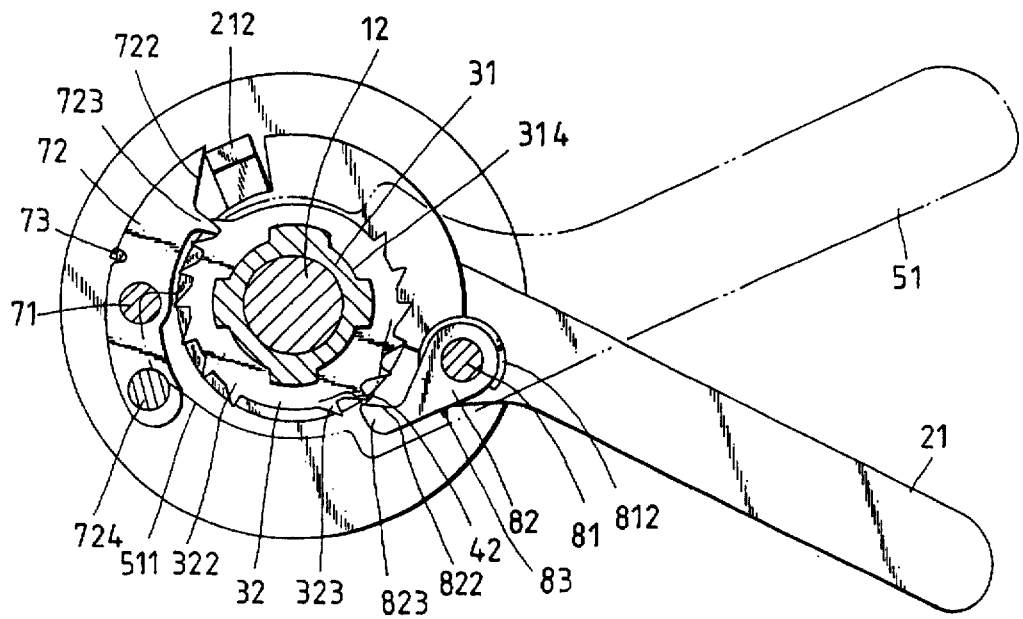
FIGS. 3 and 4 are cross sectional views of the present invention in combination for showing schematically the ongoing position relationship of the high gear action.

As shown in FIG. 3, the cable winding disk 31 is caused to remain at a fixed position by the retaining mechanism 70 so as to enable the speed changing apparatus to remain at a fixed gear.

Before the high gear action is brought about, the first ratchet portion 723 of the engaging member 72 is caused by the first pressing spring 73 to mesh with certain teeth of the first engaging portion 322 of the engaging gear disk 32 for preventing the torsion spring 33 and the recovering force of the steel cable from causing the engaging gear disk 32 to turn. The high turning rod 51 is exerted on by the elastic force of the second retrieving spring 52 while the low turning rod 21 is exerted on by the elastic force of the first retrieving spring 22 to remain at its initial position. The second cam 822 of the braking member 82 is acted on by the second braking portion 42 of the fixation plate 40 so as to cause the second ratchet portion 823 to disengage the second engaging portion 323 of the engaging gear disk 32 in order to enable the second ratchet portion 823 to remain at its initial position.

Figure 4:
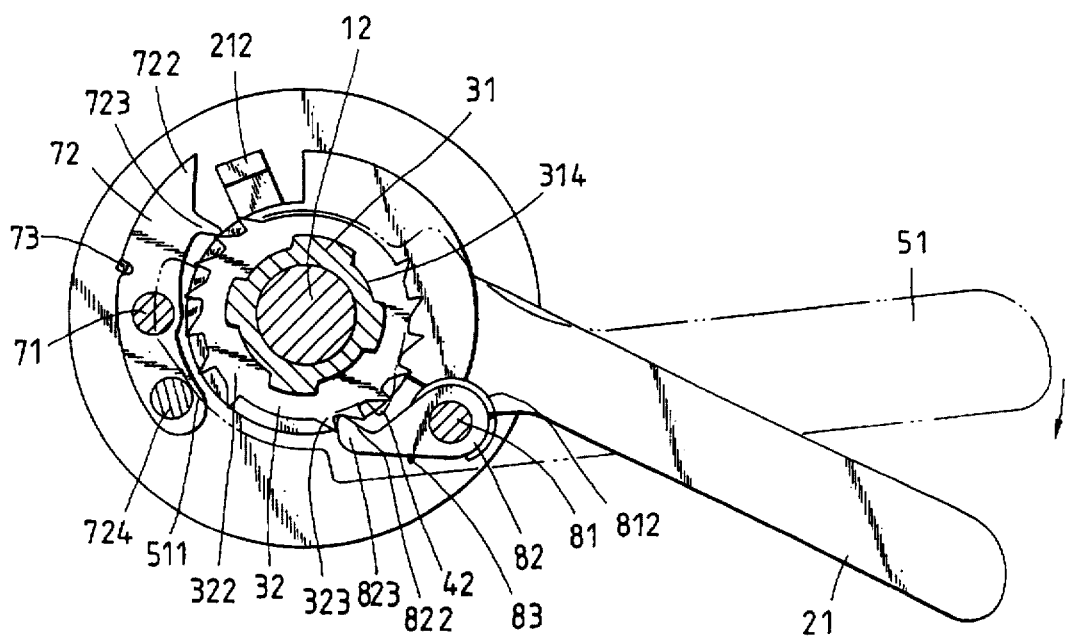
Figure 5:
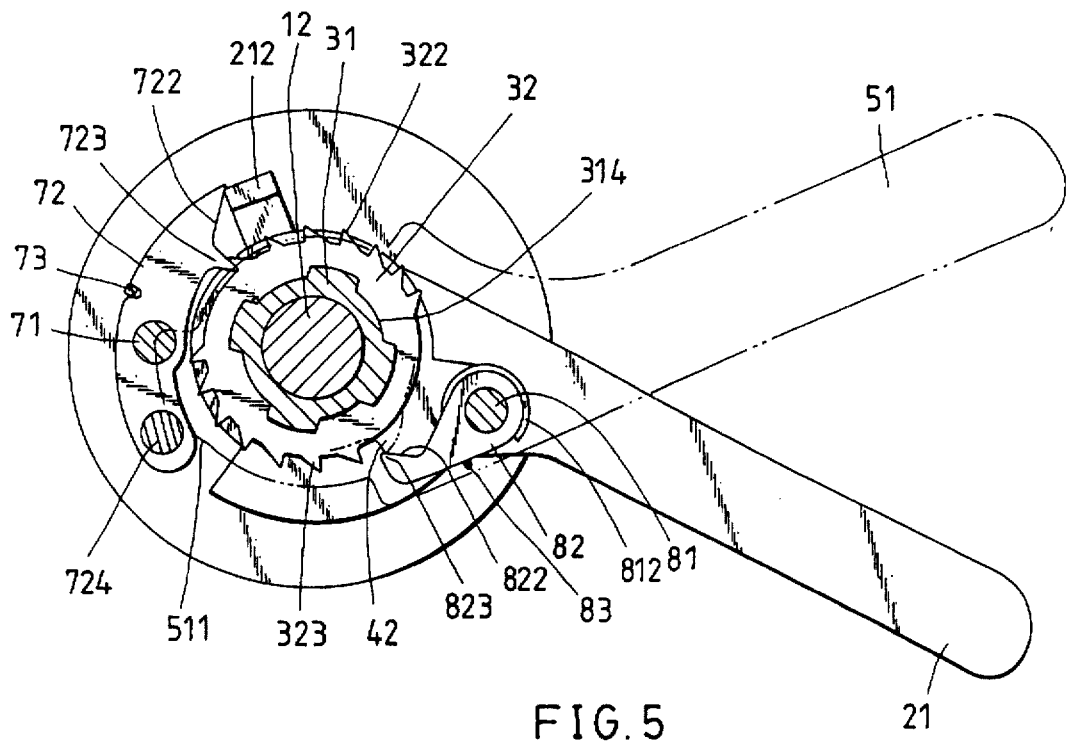
FIGS. 5-8 show schematically the ongoing position relationship of the low gear action according to the present invention.

As illustrated in FIG. 4, the engaging gear disk 32 is caused by the transmission mechanism 80 to actuate the cable winding disk 31 to tighten up the steel cable so as to bring about the high gear action.

The second cam 822 of the braking member 82 is actuated by the motion of the high turning rod 51 so as to disengage the second braking portion 42, thereby causing the second ratchet portion 823 to engage certain teeth of the second engaging portion 323 of the engaging gear disk 32 for forcing the engaging gear disk 32 to move in a direction in which the steel cable is pulled to be tightened up. In the meantime, the first ratchet portion 723 of the engaging member 72 is urged by the first engaging portion 322 to mesh with other preset teeth so as to bring about the high gear action. Upon completion of the high gear action, the high turning rod 51 is acted on by the elastic force of the second retrieving spring 52 so as to return to its initial position. The second cam 822 of the braking member 82 is once again acted on by the second braking portion 42 so as to cause the second ratchet portion 823 to disengage the second engaging portion 323, thereby causing the speed changing apparatus to remain at the neutral position. The high gear turning device is capable of bringing about a plurality of actions by one movement of the turning rod, thereby enabling a bicyclist to shift several gears by one movement of the turning rod.

As illustrated in FIGS. 5–8, a low gear action of the speed changing apparatus of the present invention is brought about by the linking relationship between the retaining mechanism 70 and the transmission mechanism 80, which form a special buffer action.

Figure 6:
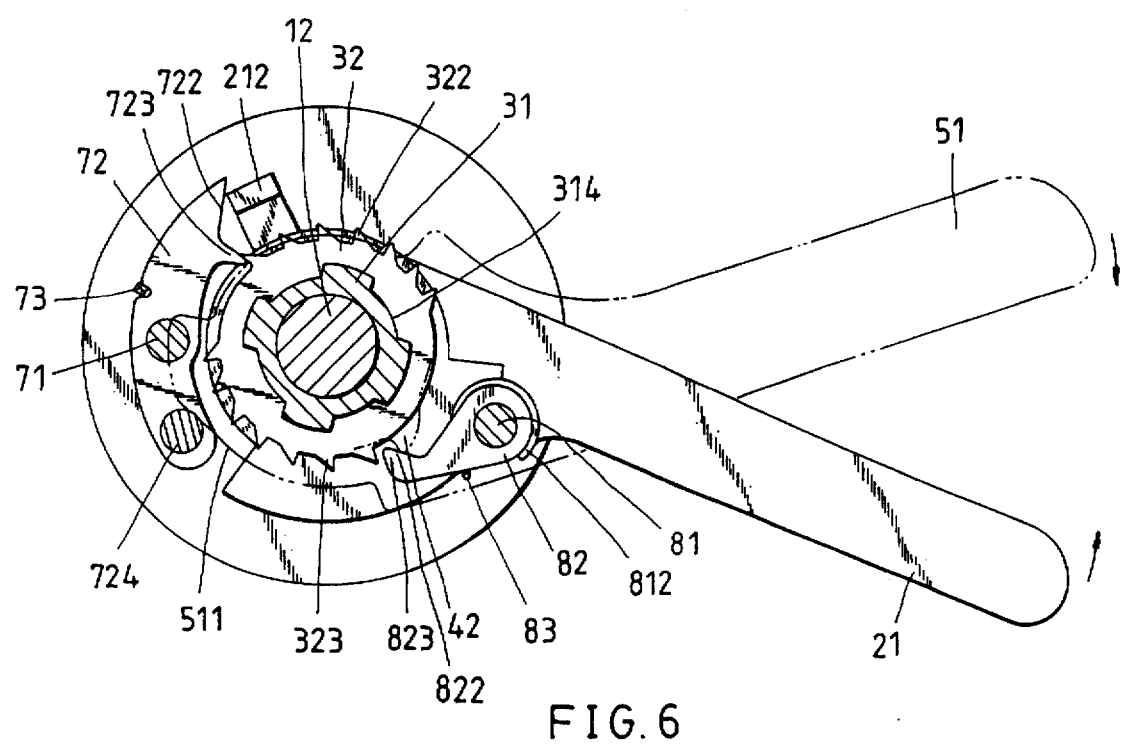
Figure 7:
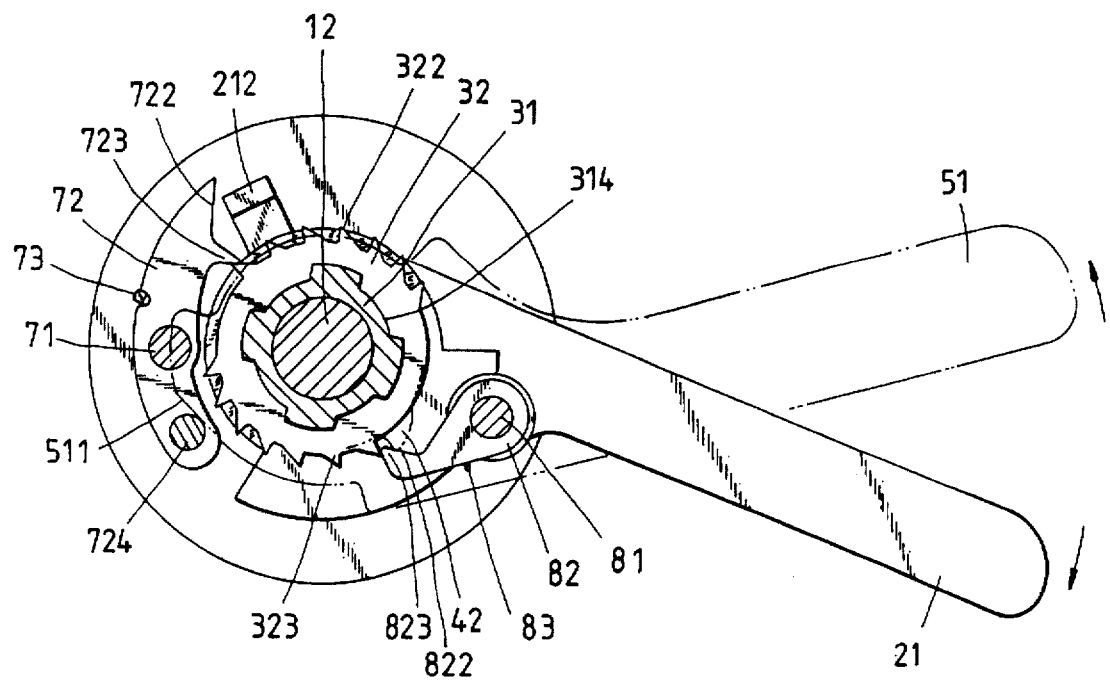
Figure 8:
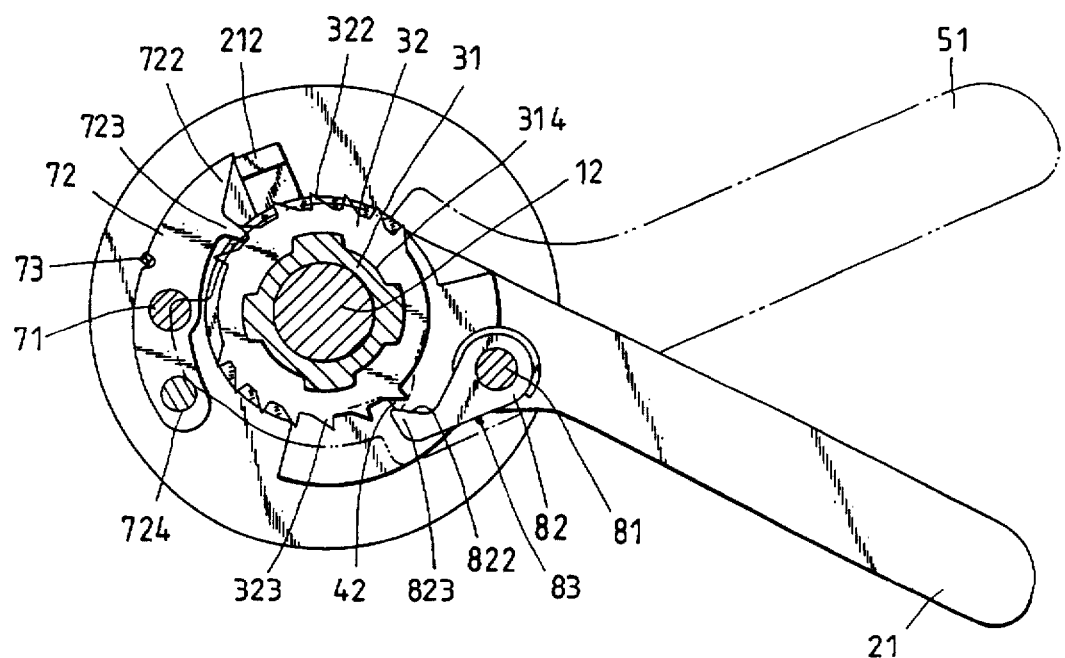

When the low turning rod 21 is moved, the first cam 722 of the engaging member 72 is acted on by the first braking portion 212 so as to cause the first ratchet portion 723 to become disengaged with the first engaging portion 322. The engaging gear disk 32 is caused to turn in a direction in which the steel cable is released. In the meantime, the third cam 511 of the high turning rod 51 is acted on by the third braking portion 724 of the engaging member 72 so as to cause the high turning rod 51 to rotate a small angle in a direction in which the steel cable is wound. The second ratchet portion 823 of the braking member 82 is retained by the second engaging portion 322 so as to prevent temporarily the engaging gear disk 32 from turning, thereby forming a buffer action as shown in FIG. 6. When the first ratchet portion 723 of the engaging member 72 is caused to become disengaged with the first engaging portion 322, the engaging gear disk 32 is acted on by the recovering force of the steel cable so as to jump several gears. For this reason, the engaging gear disk 32 must be blocked temporarily when the engaging member 72 has not been retained by certain preset teeth. This is the effect of the buffer action. When the second ratchet portion 823 of the braking member 82 is about to be retained by the teeth of the second engaging portion 323, there is a small gap between the teeth and the second ratchet portion 823. As a result, when the engaging gear disk 32 is obstructed by the second ratchet portion 823, the first ratchet portion 723 of the engaging member 72 has already passed the tooth of the first engaging portion 322 to remain above the next tooth. When the low turning rod 21 is acted on by the elastic force of the first retrieving spring 22 so as to return to its initial position, the first ratchet portion 723 of the engaging member 72 is retained by the first engaging portion 322. The third braking portion 724 is caused to move gradually away from the third cam 511. The high turning rod 51 is forced by the engaging gear disk 32 to move and is exerted on by the elastic force of the second retrieving spring 52 so as to rotate synchronously along with the engaging disk gear 32, as shown in FIG. 7. The second cam 822 is pushed by the second engaging portion 323 of the engaging gear disk 32 and is acted on by the third braking portion 42, so as to cause the second ratchet portion 823 to disengage the second engaging portion 323. The low gear action is attained completely when the engaging gear disk 32 continues turning until such time when the engaging gear disk 32 is stopped by the first ratchet portion 723 of the engaging member 72. The device is thus set at the neutral position again. The bicyclist is able to shift to the low gear step by step by moving the low gear turning device.

The speed changing apparatus of the present invention is ingeniously designed such that all component parts of the device work together in a compulsory linking manner, and that all component parts take part to bring about the high gear action, the low gear action, the locating action, the buffer action, etc. The speed change of the speed changing apparatus of the present invention is brought about with precision and stability. In addition, the speed changing apparatus of the present invention is composed of fewer component parts and can be therefore made economically. Moreover, the speed changing apparatus of the present invention is relatively compact.

The embodiment of the present invention described above is to be regarded in all respects as merely illustrative and not restrictive. Accordingly, the present invention may be embodied in other specific forms without deviating from the spirit thereof. The present invention is therefore to be limited only by the scopes of the following appended claims.

What is claimed is:

1. A bicycle speed changing apparatus comprising:

a support means;

a cable winding means fastened pivotally on said support means;

a retaining mechanism for retaining said cable winding means to remain at a fixed position on said support means a low gear shifting means fastened pivotally on said support means for turning said retaining mechanism to become disengaged with said cable winding means and causing said cable winding means to turn freely;

a transmission mechanism for driving said cable winding means to turn in the process of a high gear action, or preventing temporarily said cable winding means from turning in the process of a low gear action; and a high gear shifting means fastened pivotally on the spindle of said support means for actuating said transmission mechanism to produce the action as described above further wherein said high gear shifting means comprises a high turning rod fastened pivotally with the spindle of said support means and being capable of rotating in relation to the spindle, a second retrieving spring retained at one end thereof in an fixation plate and at another end thereof in said high turning rod for enabling said high turning rod to return to its initial position after being set at high gear.

2. A bicycle speed changing apparatus as defined in claim 1, wherein said support means has a disk and a spindle extending from one side of said disk.

3. A bicycle speed changing apparatus as defined in claim 1, wherein said low gear shifting means comprises a low turning rod fastened pivotally with said spindle of said support means and being capable of rotating back and forth in relation to said spindle, a first retrieving spring retained at one end thereof in said support means and at another end thereof in said low turning rod for enabling said low turning rod to return to its initial position after being set at low gear.

4. A bicycle speed changing apparatus as defined in claim 1, wherein said cable winding means has a cable winding disk, an engaging gear disk engaged with said cable winding disk.

5. A bicycle speed changing apparatus as defined in claim 1, wherein said retaining mechanism comprises a first shaft, an engaging member, and a first pressing spring, said first shaft received at one end thereof in the disk of said support means, and received at another end in a fixation plate, said fixation plate fastened with the spindle of said support means and said cable winding means, said engaging member fastened pivotally with said first shaft, said first pressing spring fitted over said first shaft for enabling said engaging member to urge respectively said low gear turning means, said cable winding means and said high gear turning means when said engaging member is set at a neutral position.

6. A bicycle speed changing apparatus as defined in claim 1, wherein said transmission mechanism comprises a shaft fastened pivotally with said high turning rod, a braking member fastened pivotally with said shaft for pushing said cable winding means to tighten up the cable in the process of a high gear action, or preventing temporarily said cable winding means from turning in the process of a low gear action, and a second pressing spring received in said shaft and retained at one end thereof in said high turning rod and disposed at another end thereof on said braking member for enabling said braking member to urge a fixation plate and to disengage with said cable winding means.

7. A bicycle speed changing apparatus as defined in claim 4, wherein said engaging gear disk of said cable winding means is provided peripherally with a first engaging portion for engaging with said retaining mechanism.

8. A bicycle speed changing apparatus as defined in claim 5, wherein said engaging member of said retaining mechanism is provided with a first ratchet portion engaging said first engaging portion of said engaging gear disk.

9. A bicycle speed changing apparatus as defined in claim 4, wherein said engaging gear disk of said cable winding means is provided peripherally with a second engaging portion for engaging with said transmission mechanism.

10. A bicycle speed changing apparatus as defined in claim 6, wherein said braking member of said transmission mechanism is provided with a second ratchet portion engaged with said second engaging portion of said engaging gear disk.

11. A bicycle speed changing apparatus as defined in claim 8, wherein said engaging member of said retaining mechanism is provided with a first cam engaging said transmission mechanism.

12. A bicycle speed changing apparatus as defined in claim 3, wherein said low turning rod of said low gear shifting means is provided at top thereof with a first braking portion engaged with said first cam of said engaging member.

13. A bicycle speed changing apparatus as defined in claim 8, wherein said engaging member of said retaining mechanism is provided with a third braking portion engaging said high gear turning means.

14. A bicycle speed changing apparatus as defined in claim 13, wherein said high turning rod of said high gear shifting means is provided with a third cam engaged with said third braking portion of said engaging member.

15. A bicycle speed changing apparatus as defined in claim 6, wherein said fixation plate is provided with a second braking portion engaging said braking member of said transmission mechanism.

16. A bicycle speed changing apparatus as defined in claim 10, wherein said braking member of said transmission mechanism is provided with a second cam engaged with said second braking portion of said fixation plate.

17. A bicycle speed changing apparatus as defined in claim 4, wherein said cable winding disk is provided with a plurality of slots.

18. A bicycle speed changing apparatus as defined in claim 9, wherein said first pressing spring presses permanently said first ratchet portion of said engaging member engaged with said first engaging portion of said engaging gear disk.

19. A bicycle speed changing apparatus as defined in claim 10, wherein said second pressing spring presses permanently said second ratchet portion of said braking member engaged with said second engaging portion of said engaging gear disk.

20. A bicycle speed changing apparatus as defined in claim 3, wherein said low turning rod of said low gear turning means is enabled to return to a neutral position by said first retrieving spring after being cleared from said low gear.

21. A bicycle speed changing apparatus as defined in claim 1, wherein said high turning rod of said high gear turning means is enabled to return to a neutral position by said second retrieving spring after being cleared from said high gear.

* * * * *